United States Patent
Chada et al.

(10) Patent No.: US 10,298,420 B1
(45) Date of Patent: May 21, 2019

(54) SYSTEM AND METHOD TO ENHANCE FEED-FORWARD EQUALIZATION IN A HIGH-SPEED SERIAL INTERFACE

(71) Applicant: DELL PRODUCTS, LP, Round Rock, TX (US)

(72) Inventors: Arun R. Chada, Round Rock, TX (US); Han Deng, Round Rock, TX (US); Bhyrav M. Mutnury, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/926,525

(22) Filed: Mar. 20, 2018

(51) Int. Cl.
  *H04L 25/03* (2006.01)
  *H04L 7/00* (2006.01)
(52) U.S. Cl.
  CPC ...... *H04L 25/03025* (2013.01); *H04L 7/0058* (2013.01); *H04L 25/03343* (2013.01); *H04L 25/03878* (2013.01)
(58) Field of Classification Search
  CPC ......... H04L 25/03025; H04L 25/03343; H04L 7/0058; H04L 25/03878
  See application file for complete search history.

(56) References Cited

U.S. PATENT DOCUMENTS

| | | | |
|---|---|---|---|
| 5,847,936 A | 12/1998 | Forehand et al. | |
| 7,263,123 B2 | 8/2007 | Yousef | |
| 7,443,914 B2 | 10/2008 | Azenkot et al. | |
| 8,347,005 B2 | 1/2013 | Bresniker | |
| 8,644,416 B1* | 2/2014 | Lida | H04L 25/03057 375/285 |
| 9,747,963 B2 | 8/2017 | Lee et al. | |
| 10,135,647 B2* | 11/2018 | Zerbe | H04L 25/0307 |
| 2007/0274379 A1* | 11/2007 | Valliappan | H04B 3/143 375/232 |
| 2009/0193201 A1 | 7/2009 | Brittain et al. | |
| 2010/0270597 A1 | 10/2010 | Sproch et al. | |
| 2014/0095740 A1 | 4/2014 | Ozawa | |
| 2014/0314138 A1* | 10/2014 | Zhong | H04L 25/03038 375/232 |

* cited by examiner

*Primary Examiner* — Vineeta S Panwalkar
(74) *Attorney, Agent, or Firm* — Larson Newman, LLP

(57) ABSTRACT

A high-speed serial data interface includes a transmitter and a receiver. The transmitter includes a feed-forward equalization (FFE) module. The FFE module has a main tap and at least one secondary tap. In a first mode, a sum of absolute values of a main tap compensation value and a secondary tap compensation value of each one of the at least one secondary tap is equal to one. In a second mode, the main tap compensation value has a unity gain equal to one, and each secondary tap compensation value is greater than or equal to the secondary tap compensation value in the first mode divided by the main tap compensation value in the first mode.

20 Claims, 4 Drawing Sheets

SYSTEM AND METHOD TO ENHANCE FEED-FORWARD EQUALIZATION IN A HIGH-SPEED SERIAL INTERFACE

FIELD OF THE DISCLOSURE

This disclosure generally relates to information handling systems, and more particularly relates to a system and method to enhance feed-forward equalization in a high-speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A high-speed serial data interface may include a transmitter and a receiver. The transmitter may include a feed-forward equalization (FFE) module. The FFE module has a main tap and at least one secondary tap. In a first mode, a sum of absolute values of a main tap compensation value and a secondary tap compensation value of each of the secondary taps may be equal to one. In a second mode, the main tap compensation value may have a unity gain equal to one, and each secondary tap compensation value may be greater than or equal to the secondary tap compensation value in the first mode divided by the main tap compensation value in the first mode.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
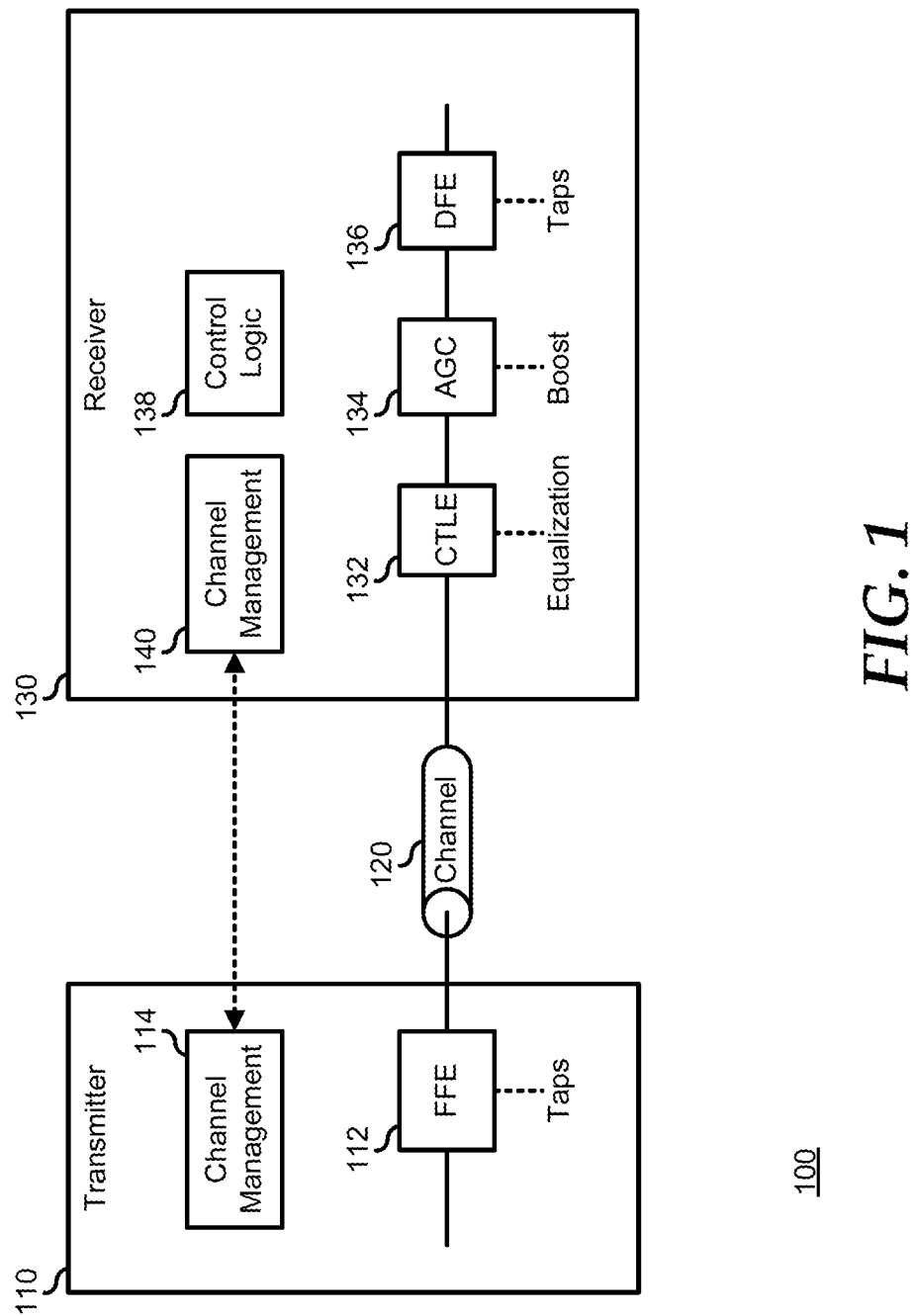
FIG. 1 is a schematic drawing of a high speed serial interface according to an embodiment of the present disclosure.

FIG. 1 illustrates an embodiment of a high speed serial channel 100 of an information handling system. Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 3.1 Specification or later, a Serial ATA (SATA) channel that is in compliance with one or more SATA specification, up to, and including the SATA 3.2 Specification or later, a SAS channel that is in compliance with one or more SAS specification, up to and including the Serial Attached SCSI 4.0 Standard or later, or another high speed serial channel.

Serial channel 100 operates to provide back channel adaptation where transmitter 110 and receiver 130 communicate with each other to optimize and adjust various compensation values within the transmitter and the receiver to compensate for the insertion loss and other signal degradations of transmission channel 120. A determination is made as to whether or not a set of compensation values is satisfactory. In a particular embodiment, the determination is based upon the bit error rate (BER) for data bits received and detected by receiver 130 in association with the set of values. In another embodiment, the determination is based upon the characteristics of the receiver eye pattern for the transmitted signals. It is possible for multiple different sets of compensation values to result in acceptable BER or receiver eye characteristics in serial channel 100. Moreover, even on a particular information handling system, operating at different times, the back channel adaptation mechanism may operate to provide different sets of compensation values based upon minute variations in the operating condition of the information handling system. As such, serial channel 100 operates to adjust an output impedance of transmitter 110 and to repeatedly perform the back channel adaptation, recording the set of compensation values for each iteration of the back channel adaptation at each impedance setting, in order to determine a best impedance setting, as described below. Then serial channel 100 further operates to use the best impedance setting for subsequent iterations of the back channel adaptation.

Transmitter 110 includes a feed-forward equalization (FFE) module 112, and a channel management module 114. FFE module 112 operates to proactively provide compensation to a transmitted signal by pre-distorting or shaping the data over several bit periods in order to invert the channel loss/distortion introduced by transmission channel 120. The amount of compensation is determined by enabling a number of circuit feed-forward taps. For example, FFE module 112 can support up to 16 taps that provide compensation based upon up to 16 subsequent data points. In a particular embodiment, FFE module 114 can be turned off, thereby reducing the power consumed by transmitter 110. In another embodiment, one or more tap of FFE module 114 can be turned on based upon the taps setting, while the rest of the taps are placed into a tri-state condition, that is, with power applied, but with the taps not providing compensation to the resultant FFE compensation. In yet another embodiment, one or more tap of FFE module 112 can be turned on based upon the taps setting, while the rest of the taps are turned off, thereby reducing the power consumed by transmitter 110. Other numbers of taps can be utilized, as needed or desired. Channel management module 114 will be described below.

Receiver 130 includes a continuous time linear equalization (CTLE) module 132, an automatic gain control (AGC) module 134, a decision feedback equalization (DFE) module 136, a control logic module 138, and a channel management module 140. In operation, serial data is received from transmitter 110, the received signal is provided to CTLE module 132, and the CTLE module operates to provide compensation for inter-signal interference (ISI) and for the insertion loss of serial channel 120, in order to open the signal eye of the received signal. The amount of compensation is determined based upon an equalization setting. For example, receiver 130 can support 21 CTLE equalization settings which each prescribe a different amount of equalization, from 0 dB to 10 dB, in 0.5 dB steps. Other numbers of settings and amounts of equalization prescribed by the equalization setting can be utilized, as needed or desired. As a general matter, the provision of CTLE equalization by CTLE module 132 is effected as a non-linear gain to the received signal. As such, the use of CTLE module 132 results in greater power consumption by serial channel 100.

The equalized signal is provided from CTLE module 132 to AGC module 134. AGC module 134 operates to provide further linear gain to the signal received from CTLE module 132 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired. In a particular embodiment, AGC 134 operates to provide linear gain in two or more frequency ranges. For example, AGC 134 can include a first gain setting for low frequency gain and a second gain setting for high frequency gain, and each setting can support 21 gain settings which each prescribe a different amount of gain, for example, from 0 dB to 10 dB, in 0.5 dB steps. Other numbers of settings and amounts of gain prescribed by the gain settings can be utilized, as needed or desired. Because the gain introduced by AGC module 134 is effected as additional gain to the received signal, the use of AGC module 134 results in further increased power consumption by serial channel 100.

The amplified signal is provided from AGC module 134 to DFE module 136. DFE module 136 operates to provide feedback based compensation to the received signal. The amount of compensation is determined by enabling a number of circuit feedback taps. For example, DFE module 136 can support up to 16 taps that provide compensation based upon up to 16 previous data points. In a particular embodiment, DFE module 136 can be turned off, thereby reducing the power consumed by receiver 130. In another embodiment, one or more tap of DFE module 136 can be turned on based upon the taps setting, while the rest of the taps are placed into a tri-state condition, that is, with power applied, but with the taps not providing feedback to the resultant DFE compensation. In yet another embodiment, one or more tap of DFE module 136 can be turned on based upon the taps setting, while the rest of the taps are turned off, thereby reducing the power consumed by receiver 130. Other numbers of taps can be utilized, as needed or desired.

Control logic module 138 operates to direct transmitter 110 to set the tap settings of FFE module 112 and to set the CTLE equalization settings of CTLE module 132, the gain settings of AGC module 134, and the tap settings of DFE module 136. Control logic module 138 communicates with transmitter 110 via a communication channel established between channel management module 114 and channel management module 140. In a particular embodiment, management module 114 and channel management module 140 represent a separate side-band communication channel for communicating adaptation instructions between transmitter 110 and receiver 130. For example, the communications between channel management module 114 and channel management module 140 can include a third party device or mechanism that provides system management for an information handling system that includes serial channel 100, such as a Baseboard Management Controller (BMC), an Integrated Dell Remote Access Controller (IDRAC), or another embedded controller, as needed or desired. In another embodiment, management module 114 and channel management module 140 represent management traffic between transmitter 110 and receiver 130 that is communicated over transmission channel 120 and an additional transmission channel from receiver 130 to transmitter 110. An example of control logic module 138 includes hardware circuitry of receiver 130 configured to provide the functionality as described herein. Another example of control logic module 138 includes a more generalized hardware processing function of receiver 130 that is configurable to provide the functionality as described herein. Such a generalized hardware processing function may utilize instructions that are hard coded into receiver 130 or firmware that can be stored in the receiver or provided thereto, as needed or desired.

Figure 2:
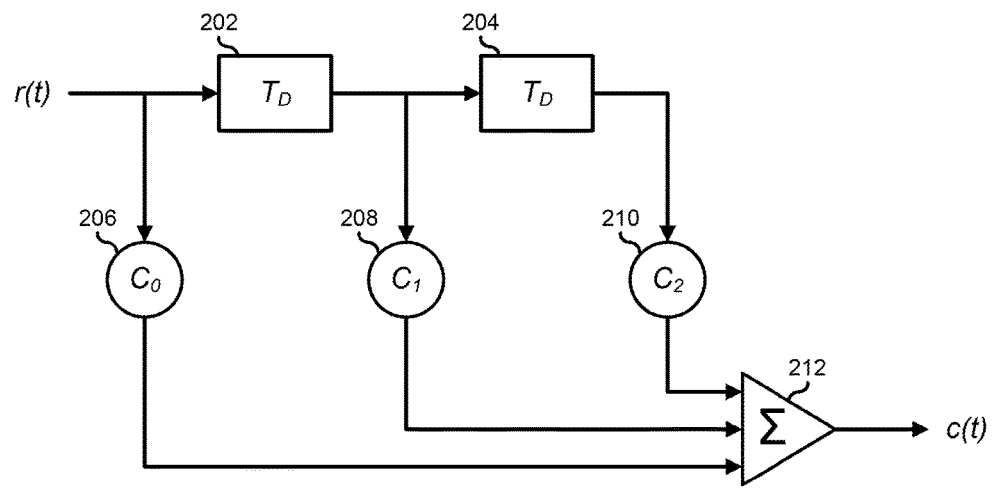
FIG. 2 is schematic drawing of a feed-forward equalizer according to an embodiment of the present disclosure.

FIG. 2 illustrates an embodiment of a FFE module 200 similar to FFE module 112. FFE module 200 includes delay units 202 and 204, taps 206, 208, and 210, and a summing block 212. FFE module 200 operates to receive a stream of data bits r(t), to time slice the bit stream r(t), to provide compensation to one or more successive bits of the time sliced bit stream r(t), and to add together the compensated bits to provide a compensated bit stream c(t) to be output from the associated transmitter. As such, time delay units 202 and 204 each operate to provide a single unit interval delay $T_D$ to the input bit stream r(t). Tap 206 receives the bit stream r(t) directly without delay and provides a compensation value $c_0$ to the bit stream, tap 208 receives the once delayed ($T_D$) bit stream from delay unit 202 and provides a compensation value $c_1$ to the once delayed bit stream, and tap 21008 receives the twice delayed ($2T_D$) bit stream from delay unit 204 and provides a compensation value $c_2$ to the twice delayed bit stream. Summing block 212 receives the compensated bit stream signals from taps 206, 208, and 210 and sums the signals to provide the compensated bit stream c(t). Thus the compensated bit stream c(t) can be given as:

$$e(t) = c_0 r(t) + c_1 r(t - 1T_D) + c_2 r(t - 2T_D)$$ Equation 1

In a particular embodiment, EFF module 200 is controlled using an enable signal that switches in all of taps 206, 208, and 210, and by providing a separate compensation value input to each of the taps that sets the respective compensation values $c_0$, $c_1$, and $c_2$. Here, if a particular tap is to be disabled, the compensation value input for that tap is set to zero (0), thus providing zero gain to the particular tap.

Typically, EFF module 200 is configured such that the compensated bit stream c(t) is power-neutral with respect to the input bit stream r(t). That is, each of compensation values $c_0$, $c_1$, and $c_2$ are set with a value less than unity gain, and such that the sum of the absolute values of the compensation values is equal to one. That is:

$$1 = |c_0| + |c_1| + |c_2|$$ Equation 2

For example, where c1 is set at −0.10 and c2 is set at −0.05, then c0 will have value of 0.85. The pulse response for FFE module 200 operating with compensation values as described in Equation 2 can be given as:

$$p_0^{FFE} = c_0 p_0 - c_1 p_1 - c_2 p_2$$ Equation 3

It will be understood that, given a lossy channel, the pulse response as provided in Equation 3 will result in a decreased signal as received by the receiver, leading to lower signal margins in the receiver. This can be seen as a signal eye trace with a reduced eye height and a reduced eye width. Such reduced signal margins in the receiver are typically compensated for with the application of CTLE compensation, AGC gain, and DFE compensation, which are provided in order to recover the bit stream and improve (lower) the bit error rate (BER) of the signal as received by the receiver. However, the use of receiver side compensation, and particularly the use of CTLE compensation and AGC gain necessitates additional receiver circuitry and, because of the amplification-nature of CTLE and AGC, results in an overall increase in the power consumed by the serial channel.

In a particular embodiment, the compensation value of $c_0$ is maintained at a unity gain value of one, and the tap compensation values are normalized to the unity gain of $c_0$. For example, where a FFE module includes two taps, as shown in FIG. 2, the tap compensation values can be determined as:

$$c_1^{new} = \frac{c_1^{old}}{c_0^{old}}, \text{ and } c_2^{new} = \frac{c_2^{old}}{c_0^{old}}$$ Equation 4

The pulse response for FFE module 200 operating with compensation values as described in Equation 4 can be given as:

$$p_0^{FFE} = p_0 - c_1^{new} p_1 - c_2^{new} p_2$$ Equation 5

It will be understood that, given a lossy channel, the pulse response as provided in Equation 5 will suffer less loss in the signal as received by the receiver, leading to higher signal margins in the receiver. This can be seen as a signal eye trace with improved eye height. Such improved signal margins in the receiver may not necessitate the application of CTLE compensation and AGC gain to recover the bit stream and maintain the BER of the signal as received by the receiver. Thus, the need for receiver side compensation, and particularly the use of CTLE compensation and AGC gain may be reduced and the power consumed by the serial channel may be reduced.

In another embodiment, the compensation value of $c_0$ is maintained at a unity gain value of one, and the tap compensation values are greater than or equal to the normalized to the unity gain of $c_0$. For example, where a FFE module includes two taps, as shown in FIG. 2, the tap compensation values can be determined as:

$$c_1^{new} \geq \frac{c_1^{old}}{c_0^{old}}, \text{ and } c_2^{new} \geq \frac{c_2^{old}}{c_0^{old}}$$ Equation 6

Here, serial channel 100 initially applies normalized compensation values for the taps in transmitter 110, and receiver 130 then determines evaluates the received signal eye to determine the eye height and the eye width. Receiver 130 then communicates to transmitter 110 via the back channel between channel management module 114 and channel management module 140, directing the transmitter to increase the compensation values for the taps until a best received signal eye has a maximum eye height and a maximum eye width. In particular, by providing the unity gain to the main tap, the eye height is improved, and by increasing the gain of the taps, the jitter of the signal eye is improved, that is, the eye width is widened.

Note that typically a FFE equalizer will be designed with one or more pre-bit taps in addition to the post-bit (delayed) taps as illustrated in FIG. 2. Further, a FFE equalizer can include more or less taps than the three taps illustrated. A generalized expression for a compensated bit stream c(t) can be given as:

$$e(t) = \sum_{n=-M}^{N} c_n r(t - nT_T)$$ Equation 7 where N is the number of post-taps and M is the number of pre-taps. It will be understood that the embodiments as described above may be applied to any number of taps, and may include pre-taps and post-taps, as needed or desired.

Figure 3:
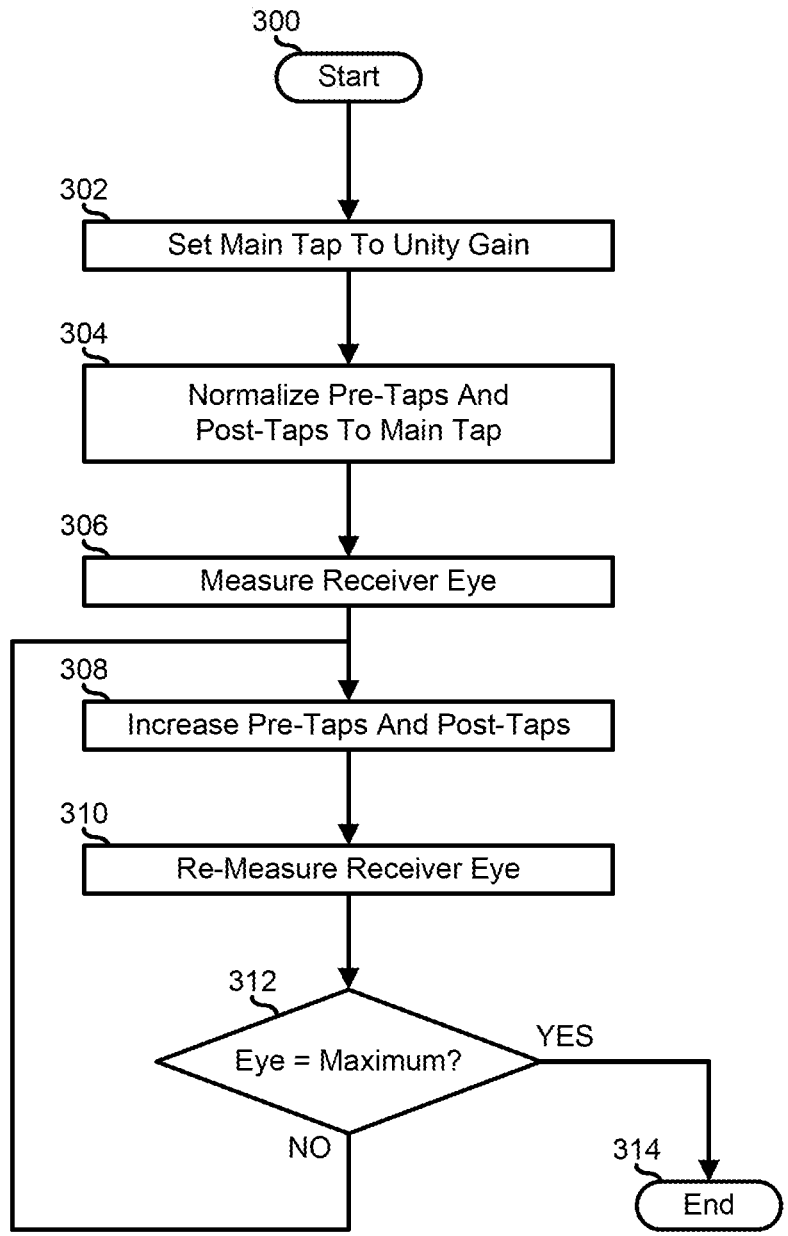
FIG. 3 is a flowchart illustrating a method of applying compensation values in a FFE module according to an embodiment of the present disclosure.

FIG. 3 illustrates a method of applying compensation values in a FFE module, starting at block 300. A main tap of a FFE module is set to a unity gain, that is, a gain of one, in block 302. The pre-taps and post-taps of the FFE module are normalized to the unity gain of the main tap in block 304. For example, the pre-taps and post-taps can be normalized as shown in Equation 4, above. A receiver eye is measured in block 306. For example, receiver 130 can determine the receiver eye trace of the received signal from transmitter 110. One or more of the compensation values of the pre-taps and post-taps are increased in block 308. For example, the pre-taps and post-taps can be normalized as shown in Equation 6, above. The receiver eye is re-measured in block 310, and a decision is made as to whether or not the receiver eye has achieved a maximum in decision block 312. For example, the receiver eye that results from the increased pre-taps and post-taps may exhibit a highest margin for eye height or eye width. If the receiver eye has not achieved a maximum, the "NO" branch of decision block 312 is taken and the method returns to block 308 where one or more of the compensation values of the pre-taps and post-taps are increased again. If the receiver eye has achieved a maximum, the "YES" branch of decision block 312 is taken and the method ends in block 314.

Figure 4:
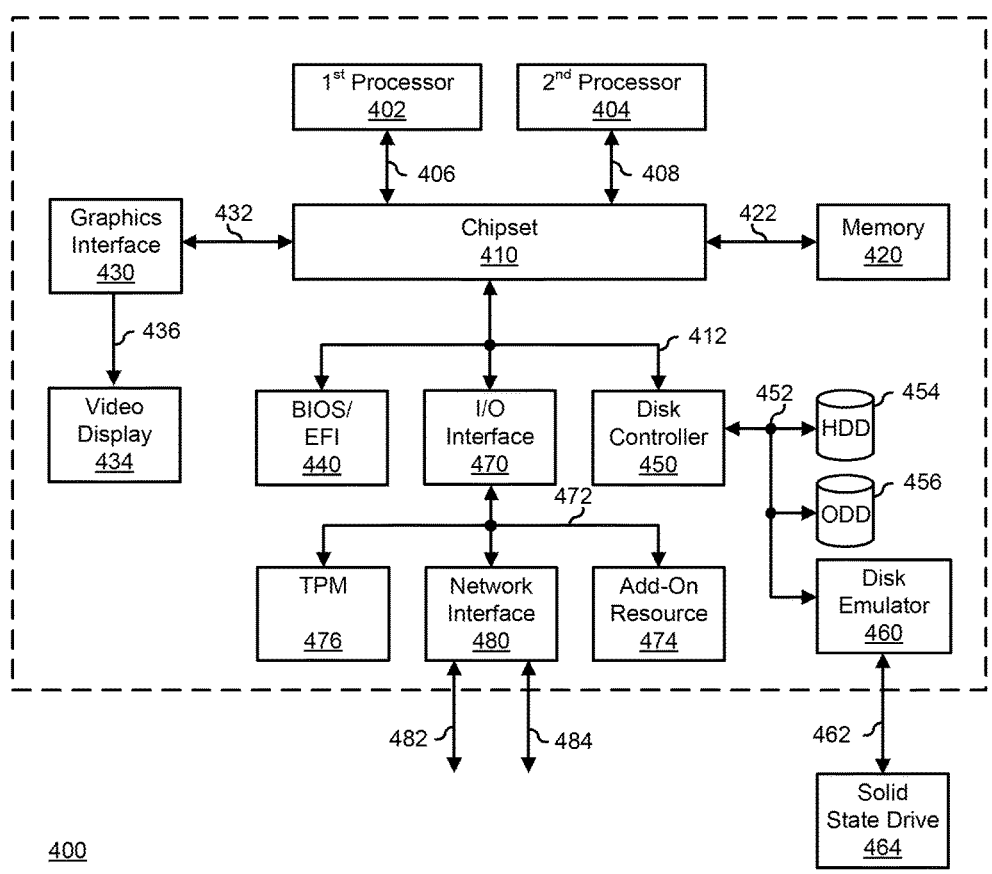
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A high-speed serial data system, comprising:
a receiver; and
a transmitter including a feed-forward equalization module having a main tap and at least one secondary tap, wherein in a first mode a sum of absolute values of a main tap compensation value and a secondary tap compensation value of each of the secondary taps is equal to 1, and wherein in a second mode the main tap compensation value has a unity gain equal to 1, and each secondary tap compensation value is greater than or equal to the secondary tap compensation value in the first mode divided by the main tap compensation value in the first mode.

2. The serial data system of claim 1, wherein the at least one secondary tap includes a post-tap that is delayed from the main tap by at least one unit interval.

3. The serial data system of claim 2, wherein the at least one secondary tap further includes a pre-tap that is advanced from the main tap by at least on unit interval.

4. The serial data system of claim 1, wherein in the second mode, each secondary tap compensation value set to be equal to the secondary tap compensation value in the first mode divided by the main tap compensation value in the first mode.

5. The serial data system of claim 4, wherein further in the second mode the transmitter receives an indication from the receiver to change at least one secondary tap compensation value in response to setting each secondary tap compensation value to be equal to the secondary tap compensation value in the first mode divided by the main tap compensation value in the first mode.

6. The serial data system of claim 4, wherein further in the second mode the transmitter sets at least one secondary tap compensation value to greater than the secondary tap compensation value in the first mode divided by the main tap compensation value in the first mode in response to receiving the indication.

7. The serial data system of claim 1, wherein the receiver includes a compensation module that is enabled when the transmitter is in the first mode and that is disabled when the transmitter is in the second mode.

8. A method of providing equalization in a high-speed serial data system, the method comprising:
setting, in a first mode, a main tap compensation value of a main tap of a feed-forward equalizer of a transmitter of the serial data system, and each of a secondary tap compensation value of at least one secondary tap of the feed-forward equalizer, wherein in setting the main tap compensation value and each secondary tap compensation value in the first mode, a sum of absolute values of the main tap compensation value and each secondary tap compensation values is equal to 1;
setting, in a second mode, the main tap compensation value to have a unity gain equal to 1; and
setting, in the second mode, each secondary tap compensation value such that each secondary tap compensation value is greater than or equal to the secondary tap compensation value in the first mode divided by the main tap compensation value in the first mode.

9. The method of claim 8, wherein the at least one secondary tap includes a post-tap that is delayed from the main tap by at least one unit interval.

10. The method of claim 9, wherein the at least one secondary tap further includes a pre-tap that is advanced from the main tap by at least on unit interval.

11. The method of claim 8, wherein further in the second mode and prior to setting each secondary tap compensation value such that each secondary tap compensation value is greater than or equal to the secondary tap compensation value in the first mode divided by the main tap compensation value in the first mode, the method further comprises:
setting each secondary tap compensation value to be equal to the secondary tap compensation value in the first mode divided by the main tap compensation value in the first mode.

12. The method of claim 11, wherein in response to setting each secondary tap compensation value to be equal to the secondary tap compensation value in the first mode divided by the main tap compensation value in the first mode, the method further comprises:
receiving, by the transmitter, an indication from a receiver of the serial data system to change at least one secondary tap compensation value.

13. The method of claim 11, wherein in response to receiving the indication, the method further comprises:
setting at least one secondary tap compensation value to greater than the secondary tap compensation value in the first mode divided by the main tap compensation value in the first mode in response to receiving the indication.

14. The method of claim 8, further comprising:
enabling a compensation module in the receiver when the transmitter is in the first mode; and
disabling the compensation module when the transmitter is in the second mode.

15. A feed-forward equalizer (FFE) for a transmitter of a high-speed serial data system, the FFE comprising:
a main tap; and
at least one secondary tap, wherein in a first mode a sum of absolute values of a main tap compensation value and a secondary tap compensation value of each of the secondary taps is equal to 1, and wherein in a second mode the main tap compensation value has a unity gain equal to 1, and each secondary tap compensation value is greater than or equal to the secondary tap compensation value in the first mode divided by the main tap compensation value in the first mode.

16. The FFE of claim 15, wherein the at least one secondary tap includes a post-tap that is delayed from the main tap by at least one unit interval.

17. The FFE of claim 16, wherein the at least one secondary tap further includes a pre-tap that is advanced from the main tap by at least on unit interval.

18. The FFE of claim 15, wherein in the second mode, each secondary tap compensation value set to be equal to the secondary tap compensation value in the first mode divided by the main tap compensation value in the first mode.

19. The FFE of claim 18, wherein further in the second mode the transmitter receives an indication from the receiver to change at least one secondary tap compensation value in response to setting each secondary tap compensation value to be equal to the secondary tap compensation value in the first mode divided by the main tap compensation value in the first mode.

20. The FFE of claim 18, wherein further in the second mode the transmitter sets at least one secondary tap compensation value to greater than the secondary tap compensation value in the first mode divided by the main tap compensation value in the first mode in response to receiving the indication.

* * * * *